United States Patent
Koo et al.

(10) Patent No.: US 9,905,324 B2
(45) Date of Patent: Feb. 27, 2018

(54) METHODS OF FABRICATING A METAL NANOWIRE DISPERSION SOLUTION AND METHODS OF FABRICATING A TRANSPARENT CONDUCTOR USING THE SAME

(71) Applicants: Samsung Display Co., Ltd., Yongin, Gyeonggi-Do (KR); Korea Advanced Institute of Science and Technology, Daejeon (KR)

(72) Inventors: Hyun Woo Koo, Hwaseong-si (KR); Tae Woong Kim, Yongin-si (KR); Jung Yong Lee, Daejeon (KR); Jae Min Lee, Chungcheongnam-do (KR)

(73) Assignees: Samsung Display Co., Ltd. (KR); Korea Advanced Institute of Science and Technology (KR)

( * ) Notice: Subject to any disclaimer, the term of this patent is extended or adjusted under 35 U.S.C. 154(b) by 269 days.

(21) Appl. No.: 14/139,592

(22) Filed: Dec. 23, 2013

(65) Prior Publication Data
US 2014/0363567 A1    Dec. 11, 2014

(30) Foreign Application Priority Data

Jun. 11, 2013    (KR) .................. 10-2013-0066687

(51) Int. Cl.
*H01B 1/20*    (2006.01)
*B22F 9/00*    (2006.01)
(Continued)

(52) U.S. Cl.
CPC ............. *H01B 1/02* (2013.01); *H01B 1/22* (2013.01); *B22F 9/00* (2013.01); *B22F 9/16* (2013.01);
(Continued)

(58) Field of Classification Search
CPC .. H01B 1/20; H01B 1/22; B82Y 40/00; B22F 9/00; B22F 9/16; B22F 9/18; B22F 9/20; B22F 9/24
(Continued)

(56) References Cited

U.S. PATENT DOCUMENTS 3,838,978 A * 10/1974 Eddleman .............. B01D 23/28
                                                                  210/406
7,749,299 B2 * 7/2010 Vanheusden .......... B22F 1/0018
                                                                  75/362
(Continued)

FOREIGN PATENT DOCUMENTS

CN    WO 2012171486 A1 * 12/2012 ............ B22F 1/0025
KR    10-2009-0026500        3/2009
(Continued)

OTHER PUBLICATIONS

Percolation in Transparent and Conducting Carbon Nanotube Networks, Hu et al., Nano Lett., vol. 4, No. 12, 2004, 2513-2517.*

*Primary Examiner* — Khanh Tuan Nguyen
*Assistant Examiner* — Haidung Nguyen
(74) *Attorney, Agent, or Firm* — Innovation Counsel LLP

(57) ABSTRACT

A method of fabricating a metal nanowire dispersion solution includes heating a first solution including a metal compound, a catalyst, an organic protection agent and menstruum, thereby forming metal nanowires in the first solution, performing a first cleaning process providing a first solvent into the metal nanowire, thereby separating the organic protection agent surrounding the metal nanowires from the metal nanowires, separating the metal nanowires from the first solution by vacuum-filtering, and dispersing the separated metal nanowires in a dispersion solvent.

10 Claims, 10 Drawing Sheets

(51) Int. Cl.
*H01B 1/02* (2006.01)
*H01B 1/22* (2006.01)
*B22F 9/20* (2006.01)
*B22F 9/18* (2006.01)
*B22F 9/16* (2006.01)
*B82Y 40/00* (2011.01)

(52) U.S. Cl.
CPC . *B22F 9/18* (2013.01); *B22F 9/20* (2013.01); *B82Y 40/00* (2013.01); *H01B 1/20* (2013.01)

(58) Field of Classification Search
USPC .................................................. 252/512, 514
See application file for complete search history.

(56) References Cited

U.S. PATENT DOCUMENTS

| | | | | |
|---|---|---|---|---|
| 7,879,153 | B1* | 2/2011 | Seo | C11D 7/12 134/1 |
| 8,043,800 | B2* | 10/2011 | Naoi | G03C 1/853 427/58 |
| 8,269,214 | B2* | 9/2012 | Smigelski, Jr. | H01L 51/5268 257/40 |
| 2008/0210052 | A1* | 9/2008 | Allemand | B22F 9/24 75/300 |
| 2009/0297388 | A1* | 12/2009 | Xia | B22F 1/0018 420/463 |
| 2013/0192423 | A1* | 8/2013 | Yang | B22F 9/24 75/370 |
| 2014/0102254 | A1* | 4/2014 | Jiang | B22F 1/0025 75/345 |

FOREIGN PATENT DOCUMENTS

| | | |
|---|---|---|
| KR | 10-2009-0112626 | 10/2009 |
| KR | 10-1011447 | 1/2011 |
| KR | 10-2011-0071526 | 6/2011 |
| KR | 10-1140356 | 5/2012 |
| KR | 10-2012-0092294 | 8/2012 |
| KR | 10-2012-0129451 | 11/2012 |

* cited by examiner

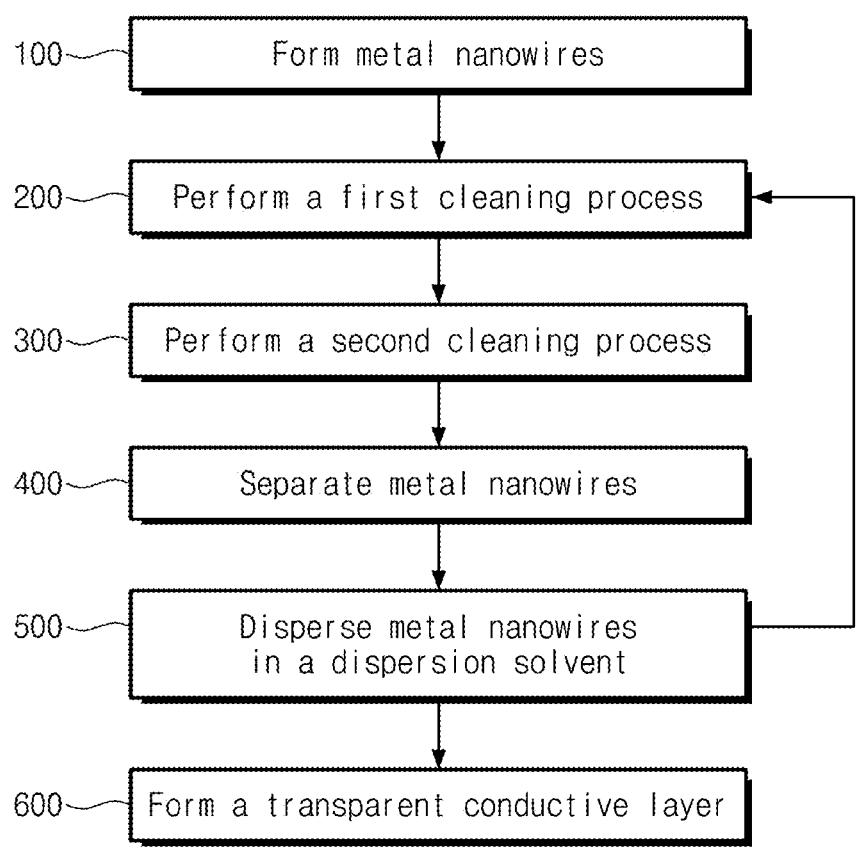

METHODS OF FABRICATING A METAL NANOWIRE DISPERSION SOLUTION AND METHODS OF FABRICATING A TRANSPARENT CONDUCTOR USING THE SAME

CROSS-REFERENCE TO RELATED APPLICATION

This U.S. non-provisional patent application claims priority under 35 U.S.C. §119 to Korean Patent Application No. 10-2013-0066687, filed on Jun. 11, 2013, in the Korean Intellectual Property Office, the disclosure of which is hereby incorporated by reference in its entirety.

BACKGROUND

The inventive concepts relate to methods of fabricating a metal nanowire dispersion solution and methods of fabricating a transparent conductor using the same and, more particularly, to methods of fabricating a metal nanowire dispersion solution having improved electrical characteristics and methods of fabricating a transparent conductor using the same.

A transparent conductor is optically transparent and electrically conductive material. The transparent conductor is widely used as transparent electrodes of a liquid crystal display device, a touch panel, an organic light emitting device and a photoelectric cell.

Metal nanowires may be used as a conductive material for forming the transparent conductor. The metal nanowire may be a wire-shaped nanostructure having a nanometer-scale size. A thickness or diameter of the metal nanowire may be in the range of about 10 nm to about 100 nm, and a length of the metal nanowire is not constrained but may be in the range of about 3 μm to about 100 μm. Thus, even though a few of metal nanowires are connected each other, the structure may have high electric conductivity and optical transparency of about 80% to about 90%.

However, it may be difficult to control shapes of the metal nanowires. Nanoparticles, nano-bars, or nano-clusters may be inevitably formed in a process of forming the metal nanowires. The nanoparticles may be globe-shaped, plate-shaped or polyhedron-shaped. The nano-bar may have a small ratio of a long axis to a short axis. The nano-clusters may be formed by aggregation of metal nanowires. As a result, a yield of the metal nanowires may be lowered.

On the other hand, the metal nanowires may be surrounded by an organic protection agent that is added in order to lead directional growth of the metal nanowires. Thus, a contact resistance between the metal nanowires may be increased due to the organic protection agent when the network is formed by the metal nanowires. As a result, it may be difficult to maintain the high electric conductivity of the nanowire network.

SUMMARY

Embodiments of the inventive concepts may provide methods of fabricating a metal nanowire dispersion solution capable of reducing a thickness of an organic protection agent.

Embodiments of the inventive concepts may provide methods of fabricating a transparent conductor having improved electric conductivity.

In one aspect, a method of fabricating a metal nanowire dispersion solution may include: heating a first solution including a metal compound, a catalyst, an organic protection agent and menstruum, thereby forming metal nanowires in the first solution, performing a first cleaning process providing a first solvent into the metal nanowire, thereby separating the organic protection agent surrounding the metal nanowires from the metal nanowires, separating the metal nanowires from the first solution by vacuum-filtering, and dispersing the separated metal nanowires in a dispersion solvent.

In some embodiments, the first solution may be vacuum-filtered through a glass funnel filter. In this case, the menstruum, the catalyst, the first solvent and the organic protection agent may pass through the glass funnel filter; and the metal nanowires may be accumulated on the glass funnel filter to be separated from the first solution.

In some embodiments, the performing a first cleaning process and the separating the metal nanowires may be repeated four, five, or six times.

In some embodiments, the first solvent may include at least one of water, isopropyl alcohol, ethanol, methanol, and any combination thereof.

In some embodiments, the organic protection agent may include polyvinyl pyrrolidone (PVP).

In some embodiments, the metal compound may include silver nitrate ($AgNO_3$) or silver chloride (AgCl); the menstruum may include ethylene glycol or glycerol; and the metal nanowire may be silver nanowires.

In some embodiments, the method may further include: performing a second cleaning process, the second cleaning process being a sonication process sonicating a second solution formed by adding the metal nanowires into a second solvent, thereby removing the organic protection agent remaining on the separated metal wires.

In some embodiments, the second solution may be sonicated using a power of about 70 W to about 200 W for a time of about 20 seconds to about 30 seconds.

In some embodiments, the second cleaning process may be repeated at least four times.

In some embodiments, the second solvent may include at least one of water, isopropyl alcohol, ethanol, methanol, and any combination thereof.

In some embodiments, the organic protection agent may include polyvinyl pyrrolidone (PVP).

In another aspect, a method of fabricating a transparent conductor may include: heating a first solution including a metal compound, a catalyst, an organic protection agent and menstruum, thereby forming metal nanowires in the first solution; performing a first cleaning process providing a first solvent into metal nanowires, thereby separating the organic protection agent surrounding the metal nanowires from the metal nanowires; separating the metal nanowires from the first solution by vacuum-filtering the first solution; dispersing the separated metal nanowires in a dispersion solvent to form a metal nanowire dispersion solution; and spraying the metal nanowire dispersion solution on a substrate to forming a transparent conductive layer. The metal nanowires may be fused with each other on the substrate to form a network, and the transparent conductive layer may include the network.

In some embodiments, a temperature of the substrate may be in the range of about 70 degrees Celsius to about 100 degrees Celsius when the transparent conductive layer is formed.

In some embodiments, a distance between the substrate and a nozzle spraying the metal nanowire dispersion solution may be in the range of about 5 cm to about 15 cm when the transparent conductive layer is formed. A spraying amount of the metal nanowire dispersion solution may be in the range of about 2 ml/min to about 6 ml/min when the transparent conductive layer is formed. A movement speed of the nozzle may be in the range of about 25 cm/sec to 35 cm/sec when the transparent conductive layer is formed.

In some embodiments, a pressure spraying the metal nanowire dispersion solution may be in the range of about 0.04 Mpa to about 0.1 Mpa.

In some embodiments, the substrate may be a flexible substrate.

In some embodiments, a length of each of the nanowires may be in the range of about 4 μm to about 100 μm.

In some embodiments, the method may further include: performing a second cleaning process, the second cleaning process being a sonication process sonicating a second solution formed by adding the separated metal nanowires into a second solvent, thereby removing the organic protection agent remaining on the separated metal wires. The second cleaning process may be performed after separating the metal nanowires from the first solution and before dispersing the separated metal nanowires in the dispersion solvent.

In some embodiments, the method may further include: thermally treating the transparent conductive layer after the transparent conductive layer is formed.

In some embodiments, the metal compound may include silver nitrate ($AgNO_3$) or silver chloride (AgCl); and the metal nanowire may be silver nanowires.

BRIEF DESCRIPTION OF THE DRAWINGS

The inventive concepts will become more apparent in view of the attached drawings and accompanying detailed description.

FIG. 5 is a flowchart illustrating a method of fabricating a transparent conductor according to example embodiments of the inventive concepts;

DETAILED DESCRIPTION OF THE EMBODIMENTS

Figure 1A:
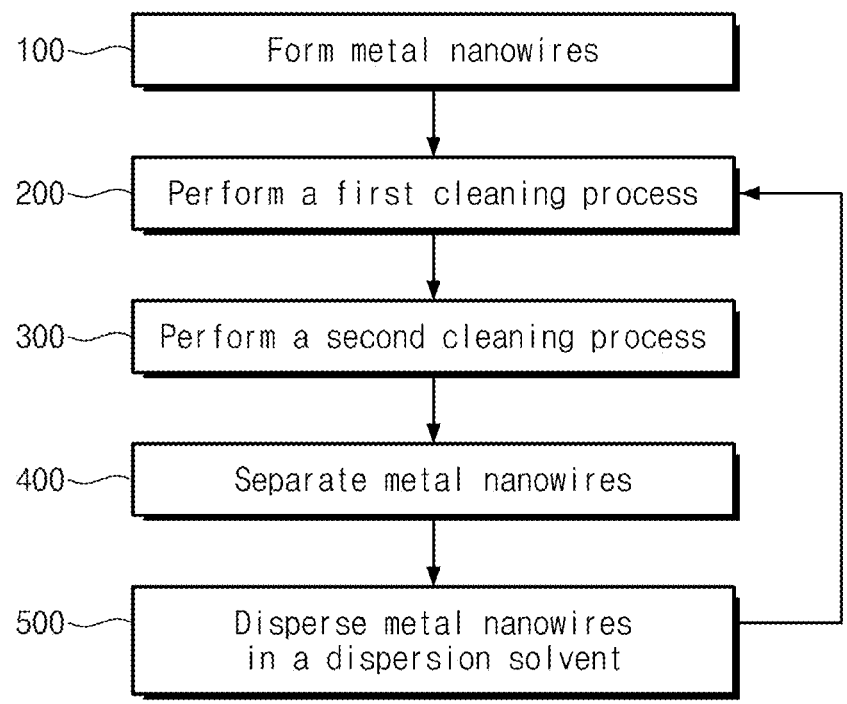
FIG. 1A is a flowchart illustrating a method of fabricating a metal nanowire dispersion solution according to exemplary embodiments of the inventive concepts.

The inventive concepts will now be described more fully hereinafter with reference to the accompanying drawings in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element, or may be connected through an intervening elements.

Similarly, it will be understood that when an element such as a layer, region or substrate is referred to as being "on" another element, it can be directly on the other element or on the other element with intervening elements between them. In contrast, the term "directly on" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1A is a flowchart illustrating a method of fabricating a metal nanowire dispersion solution according to exemplary embodiments of the inventive concepts. Referring to FIG. 1A, a method of fabricating a metal nanowire dispersion solution may include forming metal nanowires (100), performing a first cleaning process (200), performing a second cleaning process (300), separating the metal nanowires (400), and dispersing the metal nanowires (500).

Figure 2:
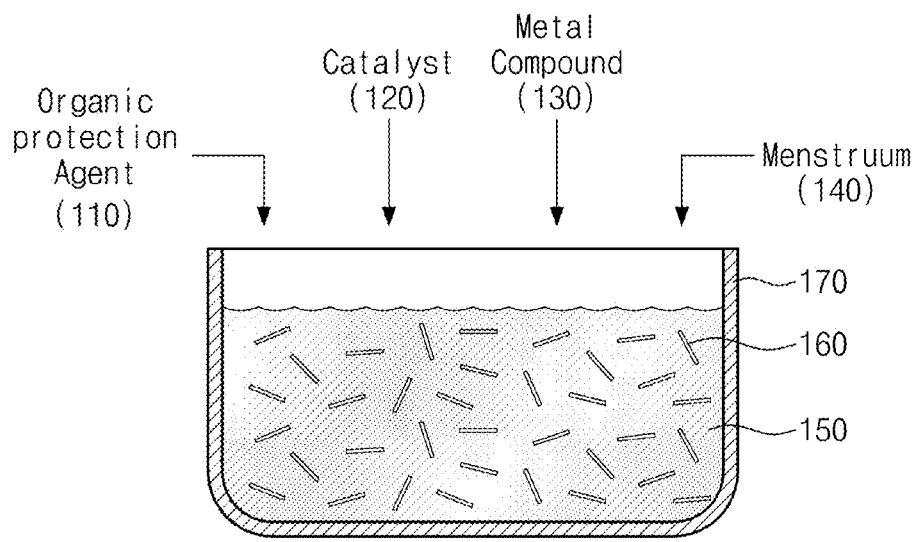
FIG. 2 is a lateral view to illustrate a step of forming a metal nanowire in FIG. 1A.

FIG. 2 is a lateral view to illustrate a step of forming a metal nanowire 100 in FIG. 1A. Referring to FIG. 2, a metal compound 130, a catalyst 120, and an organic protection agent 110 are added into a menstruum 140 to form a first solution 150. The first solution 150 is heated in the step 100 of forming the nanowires.

A container 170 is disposed on a heating part (not shown) and is filled with the first solution. During the first solution 150 is heated, metal ions in the metal compound 130 is reduced to metal atoms with the help of the catalyst 120.

In some embodiments, the menstruum 140 may be ethylene glycol or glycerol.

A heating temperature of the menstruum 140 heated by the heating part may be in the range of about 100 degrees Celsius to about 250 degrees Celsius. In particular, the heating temperature of the menstruum 140 may be about 170 degrees Celsius.

The metal compound 130 may include one of a gold compound, a silver compound, and a copper compound. Thus, the metal nanowire 160 formed by the metal compound 130 may be one of a gold nanowire, a silver nanowire, and a copper nanowire. In some embodiments, the metal compound 130 may be silver nitrate ($AgNO_3$) or silver chloride (AgCl), and the metal nanowire 160 may be the silver nanowire.

The organic protection agent 110 leads directional growth of the metal nanowires 160 when the metal compound 130 is being reduced to metal nanowire. In more detail, the organic protection agent 110 is adsorbed onto only a surface having a specific direction of the metal nanowire. Thus, the metal compound 130 is reduced to metal nanowire along a surface of the nanowire on which the organic protection agent 110 is not adsorbed. As a result, the metal nanowire 160 is grown to have a wire shape. In some embodiments, the organic protection agent 110 may include polyvinyl pyrrolidone (PVP). When the silver nanowire is grown, the PVP may be adsorbed onto a surface having a [100] direction of the silver nanowire with a thickness of several nanometers such that the silver nanowire is grown to have the wire shape.

A length of the metal nanowire 160 formed by the step 100 of forming the metal nanowires 160 may be controlled in the range of about 4 μm to about 100 μm.

When the first cleaning process (200) is performed, a first solvent is provided into the first solution 150 in order to dissolve the organic protection agent 110 surrounding the metal nanowire 160 from the metal nanowire 160.

The organic protection agent 110 surrounding the metal nanowire 160 is dissolved by the first solvent having polarity. Thus, the organic protection agent 110 is dissolved from the metal nanowire 160. The first solvent may include at least one of water, isopropyl alcohol, ethanol, methanol, and any combination thereof.

The first cleaning process (200) may be repeated several times to dissolve the organic protection agent 110 remained on the surface of the metal nanowire 160. In some embodiments, the first cleaning process (200) may be repeated four, five or six times.

The second cleaning process (300) is performed in order to further remove the organic protection agent 110 remained on surfaces of the metal nanowires 160. When the second cleaning process (300) is performed, a second solvent is added to the metal nanowires 160 to form a second solution and then the second solution is treated by a sonication process. The sonication process is performed by a sonicator generating ultrasonic waves. A sonicating power of the sonicator may be maintained in the range of about 70 W to about 200 W. A sonicating time of the second solution may be substantially equal to or less than about 40 seconds. In particular, the sonicating time of the second solution may be in the range of about 20 seconds to about 30 seconds.

The second solvent may include at least one of water, isopropyl alcohol, ethanol, methanol, and any combination thereof. The second cleaning process (300) may be repeated several times to remove the organic protection agent 110 remained on surfaces of the metal nanowires 160. In some embodiments, the second cleaning process (300) may be repeatedly performed four, five, or six times. Molecules of the second solvent and the metal nanowires vibrate by the ultrasonic waves generated from the sonicator. The metal nanowire may collide with the second solvent molecules and other metal nanowires. The metal nanowire may be repeatedly attached to or detached from the second solvent molecules and other metal nanowires. Thus, the organic protection agent is removed and separated from the surfaces of the metal nanowires.

When a transparent conductor is fabricated using the metal nanowires from which the organic protection agent is removed, the electrical and optical characteristics of the transparent conductor are improved. The transparent conductor according to the present embodiment will be described later with reference to FIGS. 10 and 11.

Figure 1B:
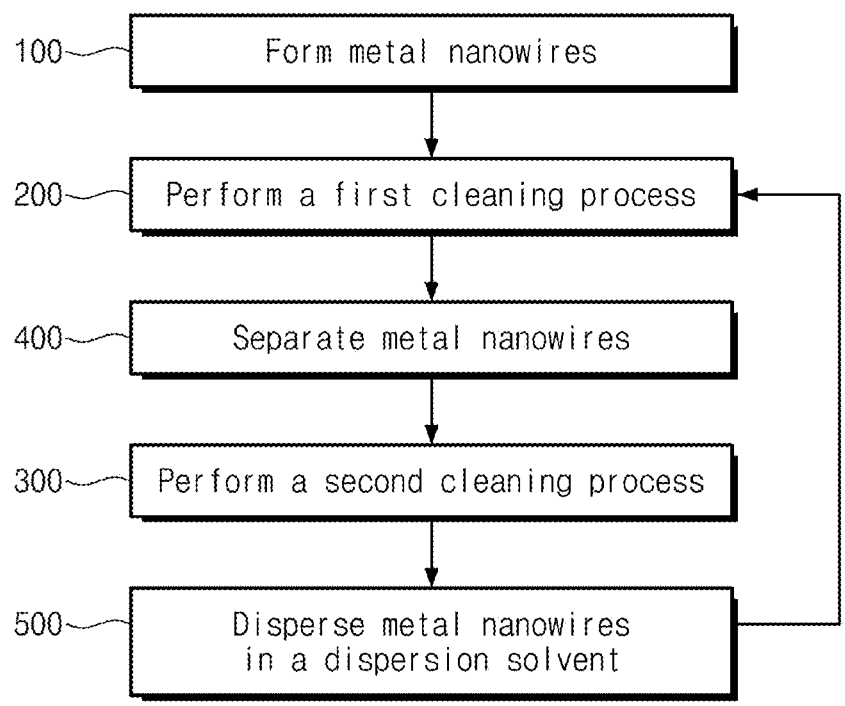
FIG. 1B is a flowchart illustrating a method of fabricating a metal nanowire dispersion solution according to another example embodiments of the inventive concepts.

The second cleaning process (300) may be performed between the step 200 of performing the first cleaning process and the step 400 of separating the metal nanowires 160. However, the inventive concepts are not limited thereto. The performing order of the second cleaning process (300) may be modified. In other words, the second cleaning process (300) may be performed after the metal nanowires are separated (400) as illustrated in FIG. 1B. In this case, an additional step of separating the metal nanowires may be performed between the step 300 of performing the second cleaning process and the step 500 of dispersing the metal nanowires.

Figure 3:
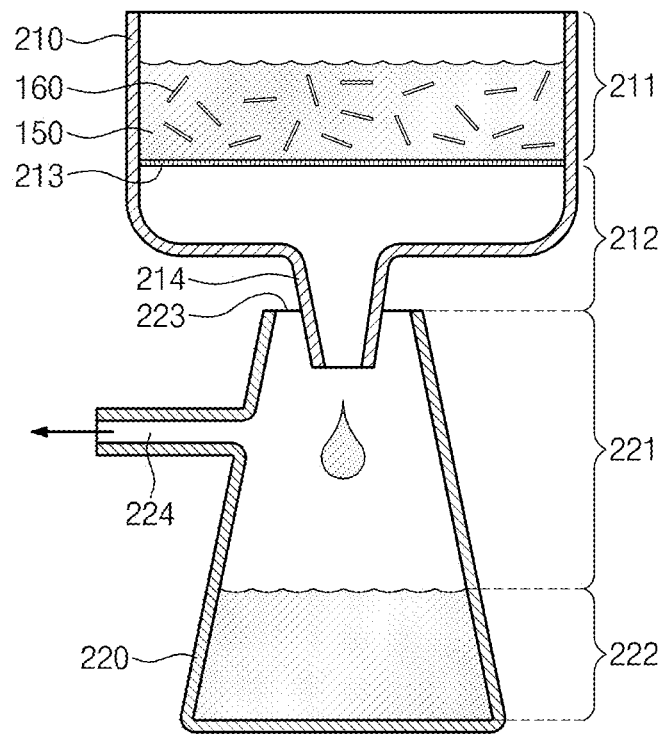
FIG. 3 is a lateral view to illustrate a step of separating a metal nanowire in FIG. 1A.

FIG. 3 is a lateral view to illustrate a step of separating a metal nanowire 400 in FIG. 1A. Referring to FIG. 3, the metal nanowires 160 are vacuum-filtered. A vacuum filtering apparatus includes a first container 210 and a second container 220. The first container 210 includes a receiving region 211, a permeating region 212, a filter 213, and a discharge part 214. The filter 213 is disposed between the receiving region 211 and the permeating region 212. The receiving region 211 is filled with a solution having metal nanowire 160. The discharge part 214 is located at one end of the permeating region 212. The filter 213 may be a glass funnel filter.

The second container 220 includes a storing region 222, a vacuum region 221, a first hole 223, and a second hole 224. The first hole 223 is connected to the discharge part 214, and the second hole 224 is connected to a vacuum pump (not shown).

The third solution 180 provided in the receiving region 211 is filtered by the filter 213. The metal nanowires 160 in the third solution 180 are accumulated on the filter 213. The menstruum 140, the catalyst 120, the first solvent and/or the second solvent (herein after "solvent") and the organic protection agent 110 in the third solution 180 permeate the filter 213 and then are moved into the permeating region 212. Thus, the metal nanowires 160 are separated from the third solution 180. The menstruum 140, the catalyst 120, the solvent, and the organic protection agent 110 in the permeating region 212 are moved into the second container 220 through the discharge part 214 and then are stored in the storing region 222 of the second container 220.

If the vacuum pump exhausts air in the vacuum region 221 through the second hole 224, pressures of the vacuum region 221 and the permeating region 212 are lowered. Since a pressure of a surface of the third solution 180 in the receiving region 211 is atmospheric pressure, the third solution 180 is vacuum-filtered by a pressure difference between the atmospheric pressure of the surface of the solution and the lowered pressure of the permeating region 212. The vacuum filtering process is performed until the menstruum 140, the catalyst 120, the solvent and the organic protection agent 110 are separated from the metal nanowire.

Since the metal nanowires 160 are separated from the third solution 180 by the vacuum filtering process, it is possible to minimize or prevent loss of the metal nanowires due to aggregation of metal nanowires which may be caused by a conventional centrifugal separation process. Thus, mass production of the metal nanowires 160 may be realized. Additionally, the metal nanowires 160 may be effectively separated from the third solution 180. If a transparent conductor is formed using the metal nanowires 160 formed by an above method, electrical and optical characteristics of the transparent conductor may be improved. The improved electrical and optical characteristics of the transparent conductor according to the present embodiment will be described later with reference to FIG. 9.

In the step of dispersing the metal nanowires (500), the separated metal nanowires are dispersed in a dispersion solvent in order to fabricate a metal nanowire dispersion solution. The dispersion solvent may include at least one of water, isopropyl alcohol, ethanol, methanol, and any combination thereof. If the property of the first solvent and the second solvent is different from that of the dispersion solvent, aggregation between the metal nanowires may occur. Thus, the dispersion solvent may have the same material as the first solvent and the second solvents. The dispersion solvent may be a different material from the first solvent and the second solvents under the condition that the aggregation of the metal nanowires does not occur.

After the metal nanowires are added into the dispersion solvent to form a dispersion solution, the dispersion solution may be treated by a sonication process in order to effectively disperse the metal wires in the dispersion solvent.

Figure 4A:
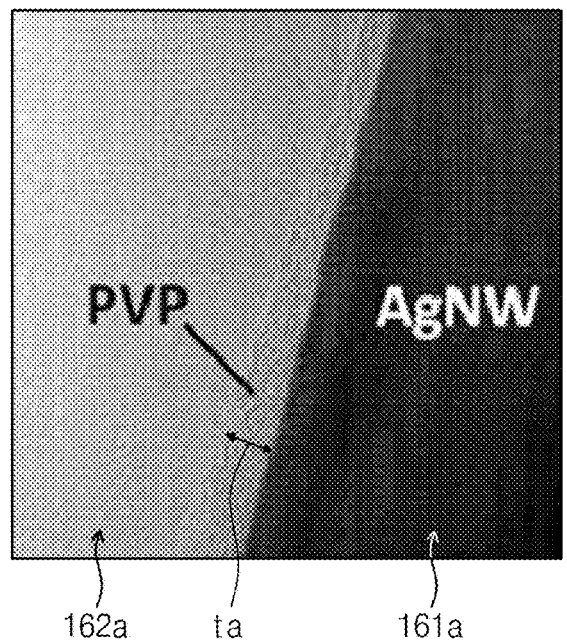
FIG. 4A is a transmission electron microscope (TEM) image of a silver nanowire fabricated according to an experimental example.
Figure 4B:
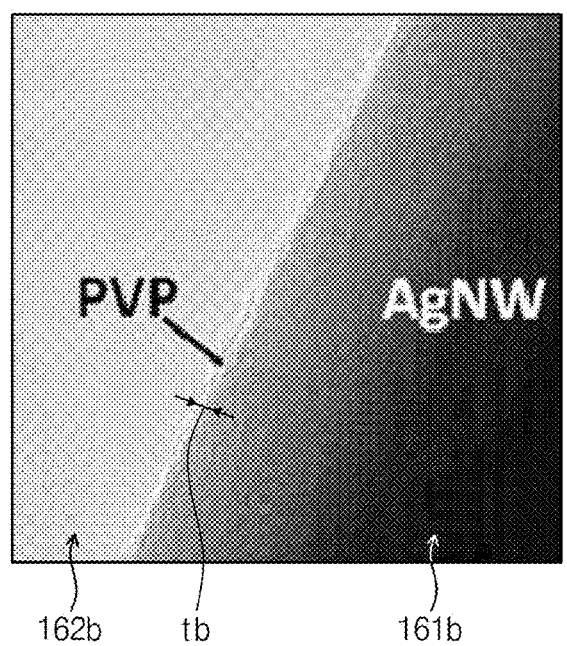
FIG. 4B is a TEM image of a silver nanowire fabricated according to another experimental example.

FIG. 4A is a transmission electron microscope (TEM) image of a silver nanowire fabricated according to an experimental example. FIG. 4B is a TEM image of a silver nanowire fabricated according to another experimental example.

FIG. 4A is a TEM image of an experimental example fabricated by performing the first cleaning process (200) and the second cleaning processes (300) only one time. FIG. 4B is a TEM image of an experimental example fabricating by repeatedly performing the first cleaning process (200) and the second cleaning processes (300) five times.

Referring to FIG. 4A, a first PVP layer (i.e., the organic protection agent) 162a is formed on a surface of a first silver nanowire (i.e., the metal nanowire) 161a when the first cleaning process (200) and the second cleaning processes (300) are performed only one time. A thickness of the first PVP layer 162a is about 4 nm.

Referring to FIG. 4B, a second PVP layer (i.e., the organic protection agent) 162b is formed on a surface of a second silver nanowire (i.e., the metal nanowire) 161b when the first cleaning process (200) and the second cleaning processes (300) are repeatedly performed five times. A thickness of the second PVP layer 162b is about 0.5 nm.

That is, the first PVP layer 162a is thicker than the second PVP layer 162b. Thus, as the number repetition of the first cleaning process (200) and second cleaning processes (300) increases, the thickness of the organic protection agent adsorbed onto the metal nanowire decreases.

FIG. 5 is a flowchart illustrating a method of fabricating a transparent conductor according to example embodiments of the inventive concepts. Referring to FIG. 5, a method of fabricating the transparent conductor may include forming metal nanowires (100), performing a first cleaning process (200), performing a second cleaning process (300), separating the metal nanowires (400), dispersing the metal nanowires (500), and forming a transparent conductive layer (600). The steps 100, 200, 300, 400, and 500 are the same as described with reference to FIGS. 1 to 4, so that the descriptions thereto are omitted for the purpose of ease and convenience in explanation.

When the transparent conductive layer is formed (600), the metal nanowire dispersion solution is sprayed on a substrate 680 in order to form the transparent conductive layer on the substrate 680.

Figure 6:
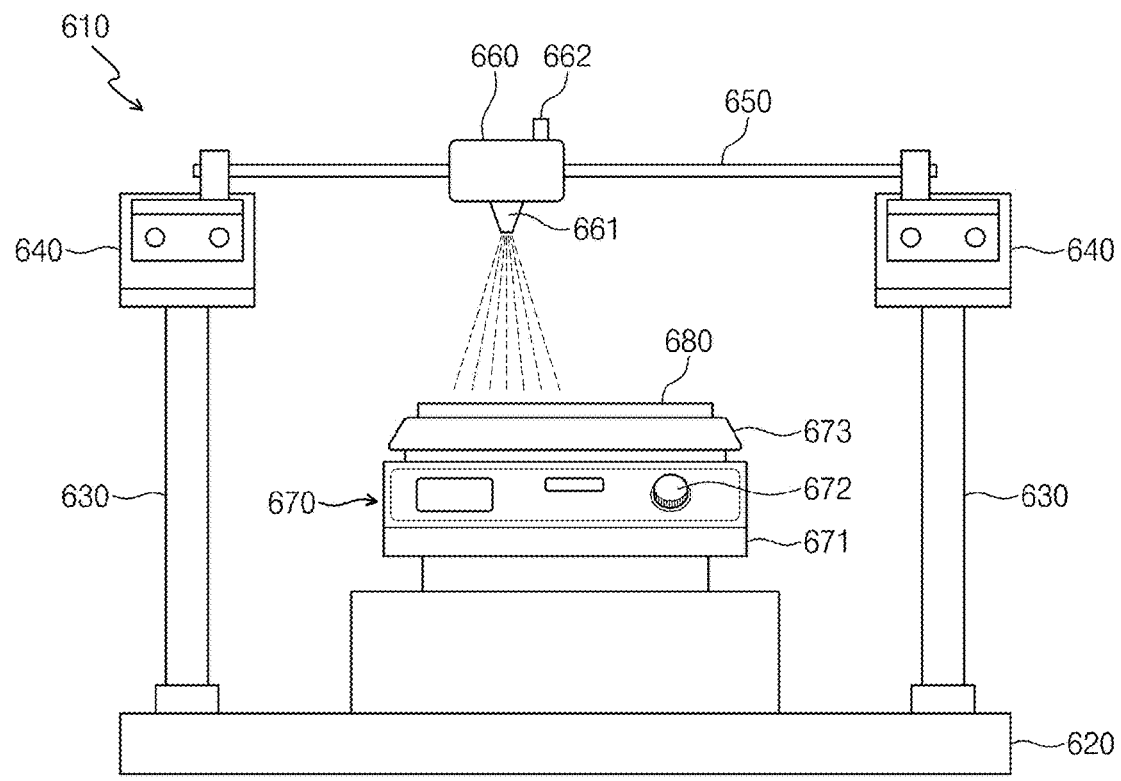
FIG. 6 is a lateral view to illustrate a step of forming a transparent conductive layer according to an embodiment of the inventive concepts.

FIG. 6 is a lateral view to illustrate a step of forming a transparent conductive layer according to an embodiment of the inventive concepts. Referring to FIG. 6, a spray apparatus spraying the metal nanowire dispersion solution includes a base 620, a pair of first frames 630, a pair of first movement units 640, a second movement unit 660, a second frame 650, and a hot plate 670. The second movement unit 660 includes a nozzle 661 and an injecting pipe 662.

The hot plate 670 is disposed on a center portion of the base 620. The hot plate 670 includes a body 671, a temperature controller 672, and a heating plate 673. The body 671 generates heat and then transmits the generated heat to the heating plate 673. The temperature controller 672 is disposed on a front side of the body 671 to control a temperature of the heating plate 673. The heating plate 673 transmits the heat to the substrate 680 disposed on the heating plate 673.

The pair of first frames 630 facing each other may vertically extend from both edges of the base 620, respectively. The first movement units 640 is combined with a top end portion of each of the first frames 630, respectively. The first movement units 640 are also combined with the second frame 650. The first movement units 640 move forward and backward. The second movement unit 660 is combined with the second frame 650. The second movement unit 660 laterally moves along the second frame 650.

The nozzle 661 is disposed on a bottom surface of the second movement unit 660. The injecting pipe 662 is disposed on a top surface of the second movement unit 660. The metal nanowire dispersion solution is supplied to the second movement unit 660 through the injecting pipe 662. The metal nanowire dispersion solution is sprayed on the substrate 680 through the nozzle 661.

The nozzle 661 moves forward, backward, rightward, and leftward by the first movement units 640 and the second movement unit 660 to spray the metal nanowire dispersion solution on an entire top surface of the substrate 680.

The substrate 680 may be a rigid substrate such as a glass substrate. However, the inventive concepts are not limited thereto. In other embodiments, the substrate 680 may be a flexible substrate such as polyethylene naphthalate (PEN) film. The metal nanowires have a flexural characteristic. Thus, the transparent conductive layer and transparent conductor including the metal nanowires have flexibility. As a result, the transparent conductor may be applied to flexible electronic devices such as a flexible display.

A temperature of the substrate 680 is maintained in the range of about 70 degrees Celsius to about 100 degrees Celsius in order to evaporate the dispersion solvent 140 in a moment. A distance between the substrate 680 and the nozzle 661 may be in the range of about 5 cm to about 15 cm. A pressure spraying the metal nanowire dispersion solution may be in the range of about 0.04 Mpa to about 0.1 Mpa. A movement speed of the nozzle 661 may be in the range of about 25 cm/sec to about 35 cm/sec. A spraying amount of the metal nanowire dispersion solution is in the range of about 2 ml/min to about 6 ml/min.

Figure 7:
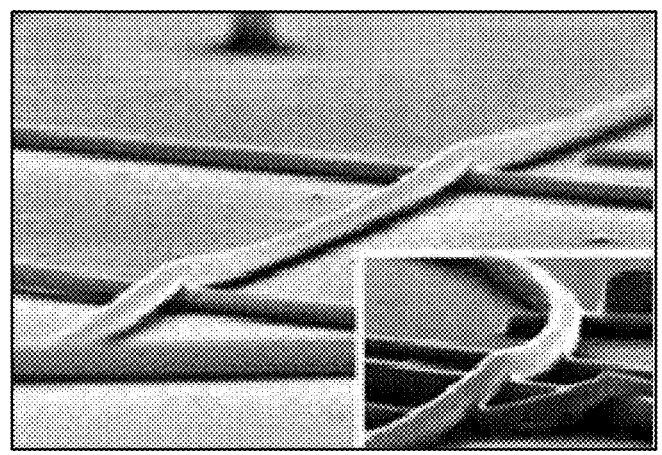
FIG. 7 is a TEM image of a transparent conductor fabricated according to an experimental example.

FIG. 7 is a TEM image of a transparent conductor fabricated according to an experimental example. Referring to FIG. 7, the metal nanowires cross each other to form a network. Thus, the transparent conductive layer is formed on the substrate 680. The metal nanowires are fused to be combined with each other in crossing regions of the metal nanowires. Thus, a contact resistance between the metal nanowires is reduced to improve electric conductivity of the transparent conductive layer. The fusion of the metal nanowires is due to the metal nanowires having kinetic energy when they are sprayed toward the substrate 680.

In some embodiments, the method of fabricating the transparent conductive layer may further include thermally treating the transparent conductive layer after the transparent conductive layer is formed (600). The thermal treatment of the transparent conductive layer is performed at a temperature of about 100 degrees Celsius to about 300 degrees Celsius for about 5 minutes to about 40 minutes. The metal nanowires sprayed in the network form on the substrate 680 are fused with each other by the thermal treatment. Thus, the contact resistance between the metal nanowires can be reduced to improve the electric conductivity of the transparent conductive layer.

Figure 8:
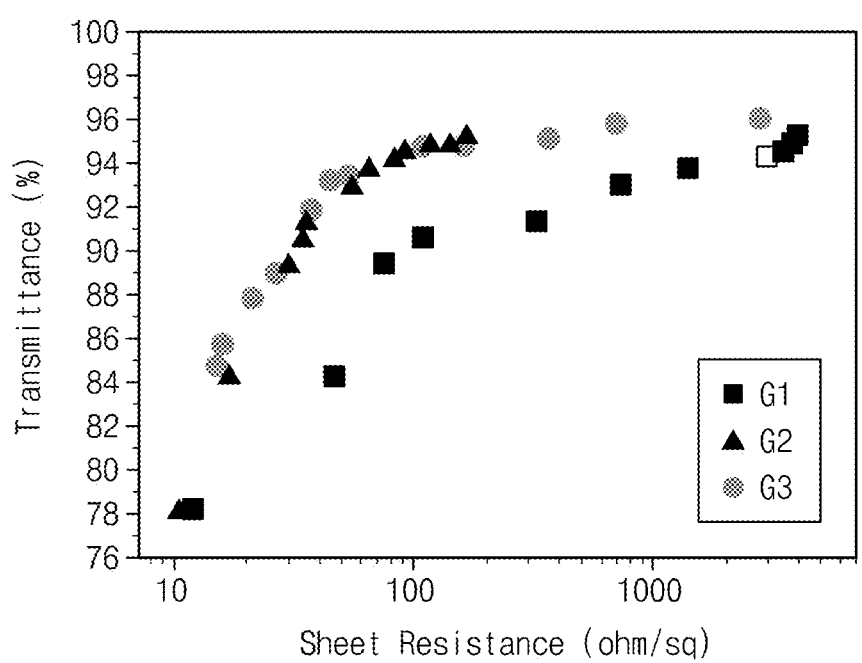
FIG. 8 is a graph of a sheet resistance vs. a transmittance of a transparent conductor fabricated according to an embodiment of the inventive concepts.

FIG. 8 is a graph of a sheet resistance vs. a transmittance of a transparent conductor fabricated according to an embodiment of the inventive concepts. Referring to FIG. 8, a first graph G1 is a graph of a transparent conductor (hereinafter, referred to as 'a comparison sample 1') consisting of metal nanowires fabricated by a general drop casting method. A second graph G2 is a graph of a transparent conductor (hereinafter, referred to as 'a comparison sample 2') consisting of metal nanowires fabricated by a general drop casting method and thermally treated. A third graph G3 is a graph of the transparent conductor (hereinafter, referred to as 'an embodiment sample') fabricated according to an embodiment of the inventive concepts. That is, the embodiment sample of the third graph G3 was fabricated by forming the metal nanowires (100), performing the first cleaning process (200), performing the second cleaning process (300), separating the metal nanowires from the first solution (400), dispersing the metal nanowires (500), and forming the transparent conductive layer (600). The embodiment sample according to the inventive concepts has a transmittance higher than that of the comparison sample 1 at the same sheet resistance. Additionally, the transmittance of the embodiment sample corresponds to the transmittance of the comparison sample 2 at the same sheet resistance. This is because the sprayed metal nanowires are fused with each other to lower the contact resistance between the metal nanowires, as described with reference to FIG. 7.

Figure 9:
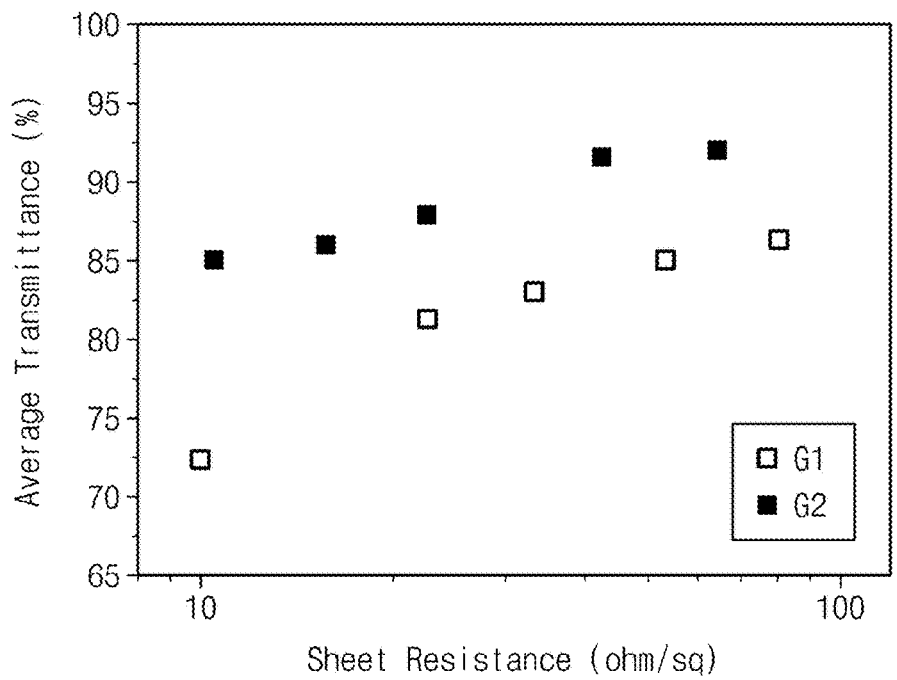
FIG. 9 is a graph of a sheet resistance vs. a transmittance of a transparent conductor fabricated according to an embodiment of the inventive concepts.

FIG. 9 is a graph of a sheet resistance vs. a transmittance of a transparent conductor fabricated according to an embodiment of the inventive concepts. Referring to FIG. 9, a first graph G1 is a graph of a transparent conductor (hereinafter, referred to as 'a comparison sample') fabricated by spraying metal nanowires separated by a general centrifugal separation method. A second graph G2 is a transmittance graph of the transparent conductor (hereinafter, referred to as 'an embodiment sample') fabricated according to an embodiment of the inventive concepts. That is, the embodiment sample of the second graph G2 was fabricated by forming the metal nanowires (100), performing the first cleaning process (200), performing the second cleaning process (300), separating the metal nanowires from the first solution (400), dispersing the metal nanowires (500), and forming the transparent conductive layer (600). The embodiment sample according to the inventive concepts has a transmittance higher than that of the comparison sample at the same sheet resistance. This is because the vacuum filtering method according to inventive concepts minimizes or prevents the aggregation, damage and loss of metal nanowires that are caused by the centrifugal separation method. As a result, the amount of the network of the metal nanowires may be increased in the transparent conductor according to the inventive concepts, thereby improving the electric conductivity of the transparent conductor.

Figure 10:
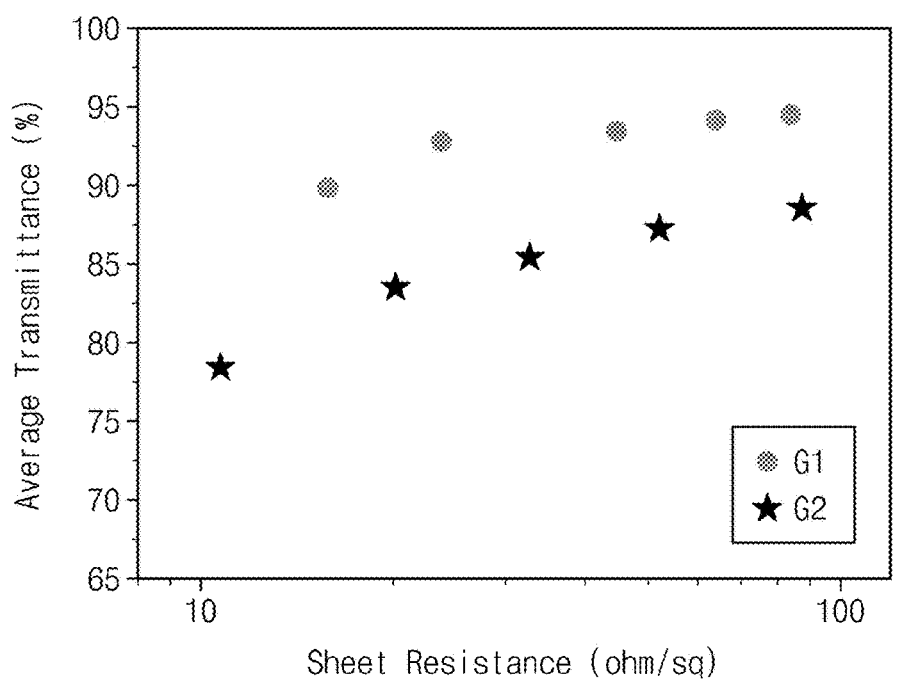
FIG. 10 is a graph of a sheet resistance vs. a transmittance of a transparent conductor fabricated according to an embodiment of the inventive concepts.

FIG. 10 is a graph of a sheet resistance vs. a transmittance of a transparent conductor fabricated according to an embodiment of the inventive concepts. Referring to FIG. 10, a first graph G1 is a graph of a transparent conductor (hereinafter, referred to as 'an embodiment sample 1') fabricated according to an embodiment of the inventive concepts. That is, the embodiment sample 1 of the first graph G1 was fabricated by forming the metal nanowires (100), performing the first cleaning process (200), performing the second cleaning process (300), separating the metal nanowires from the first solution (400), dispersing the metal nanowires (500), and forming the transparent conductive layer (600). A second graph G2 is a graph of a transparent conductor (hereinafter, referred to as 'an embodiment sample 2') fabricated according to another embodiment of the inventive concepts. In detail, the embodiment sample 2 of the second graph G2 was fabricated by the steps 100, 200, 400, 500, and 600. That is, the step 300 of performing the second cleaning process was omitted in the method of fabricating the embodiment sample 2. The embodiment sample 1 has a transmittance higher than that of the embodiment sample 2 at the same sheet resistance. This is because the organic protection agent 110 not chemically separated by the first cleaning process (200) is physically separated from the metal nanowires by the sonication process of the second cleaning process (300) to lower the contact resistance between the metal nanowires.

Figure 11:
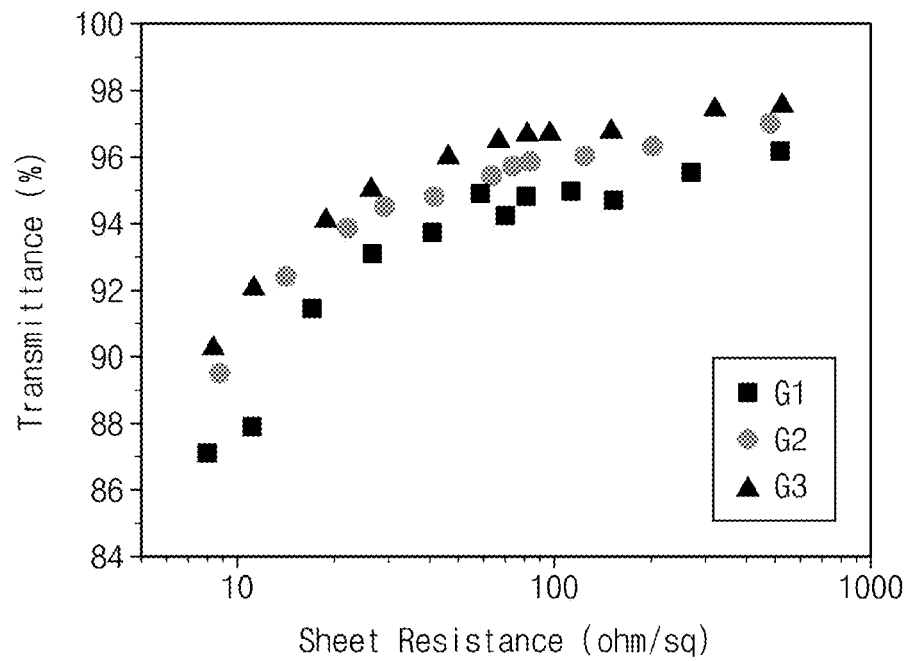
FIG. 11 is a graph of a sheet resistance vs. a transmittance of a transparent conductor fabricated according to an embodiment of the inventive concepts.

FIG. 11 is a graph of a sheet resistance vs. a transmittance of a transparent conductor fabricated according to an embodiment of the inventive concepts.

Referring to FIG. 11, a first graph G1 is a graph of a transparent conductor (hereinafter, referred to as 'an embodiment sample 1') fabricated by forming the metal nanowires (100), performing the first cleaning process (200), performing the second cleaning process (300), separating the metal nanowires from the first solution (400), dispersing the metal nanowires (500), and forming the transparent conductive layer (600), according to an embodiment of the inventive concepts. A second graph G2 is a graph of a transparent conductor (hereinafter, referred to as 'an embodiment sample 2') according to another embodiment of the inventive concepts. In detail, the steps 200, 300 and 400 were repeated three times in a fabricating method of the embodiment sample 2 that includes the steps 100, 200, 300, 400, 500, and 600. A second graph G3 is a graph of a transparent conductor (hereinafter, referred to as 'an embodiment sample 3') according to still another embodiment of the inventive concepts. In detail, the steps 200, 300 and 400 were repeated five times in a fabricating method of the embodiment sample 3 that includes the steps 100, 200, 300, 400, 500, and 600. At the same sheet resistance, the embodiment sample 2 has a transmittance higher than that of the embodiment sample 1 and the embodiment sample 3 has a transmittance higher than that of the embodiment sample 2. This is because the thickness of the organic protection agent adsorbed on the metal nanowire is reduced as the number of repetition of the steps 200, 300 and 400 increase. Thus, the contact resistance between the metal nanowires is reduced.

Figure 12:
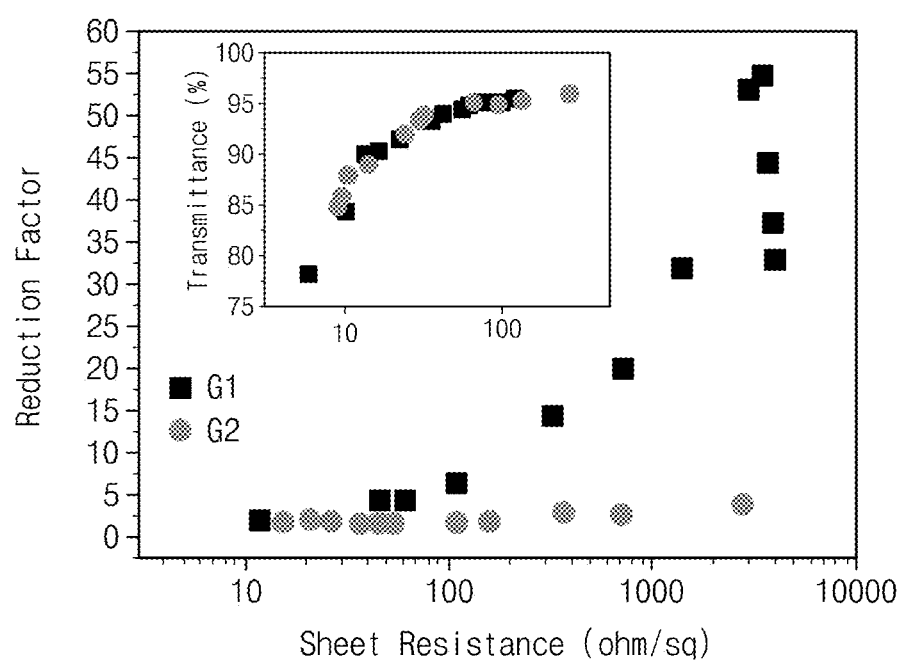
FIG. 12 is a graph of a sheet resistance and a reduction factor vs. a transmittance of a transparent conductor fabricated according to an embodiment of the inventive concepts.

FIG. 12 is a graph of a sheet resistance and a reduction factor vs. a transmittance of a transparent conductor fabricated according to an embodiment of the inventive concepts. Referring to FIG. 12, a first graph G1 is a graph of a transparent conductor (hereinafter, referred to as 'a comparison sample') fabricated using a general drop casting method and a general thermal treatment. A second graph G2 is a graph of a transparent conductor (hereinafter, referred to as 'a embodiment sample') fabricated by forming the metal nanowires (100), performing the first cleaning process (200), performing the second cleaning process (300), separating the metal nanowires from the first solution (400), dispersing the metal nanowires (500), forming the transparent conductive layer (600), and performing the thermal treatment, according to an embodiment of the inventive concepts. A reduction factor means a value obtained by dividing a difference between sheet resistances before and after the thermal treatment by the sheet resistance before the thermal treatment. The reduction factor is an index for confirming a reduction degree of the sheet resistances before and after the thermal treatment. The reduction factor of the comparison sample is less than the reduction factor of the embodiment sample at the same sheet resistance. Thus, when the transparent conductor is formed by the drop casting method, metal nanowires are fused with each other only after the thermal treatment so that the contact resistance between the metal nanowires are lowered to reduce the sheet resistance of the transparent conductor.

On the contrary, when the transparent conductor is fabricated according to the embodiment of the inventive concepts, the metal nanowires are already fused with each other by spraying the metal nanowire dispersion solution so that the contact resistance is lowered. Thus, the sheet resistance of the transparent conductor may not be remarkably reduced by the thermal treatment. Additionally, the transmittance of the embodiment sample corresponds to the transmittance of the comparison sample as illustrated in a transmittance graph inserted in FIG. 12. As a result, even though the thermal treatment is omitted in the fabricating method according to inventive concepts, the transparent conductor according to inventive concepts has characteristics corresponding to those of the transparent conductor fabricated using the general drop casting method and the thermal treatment.

Figure 13A:
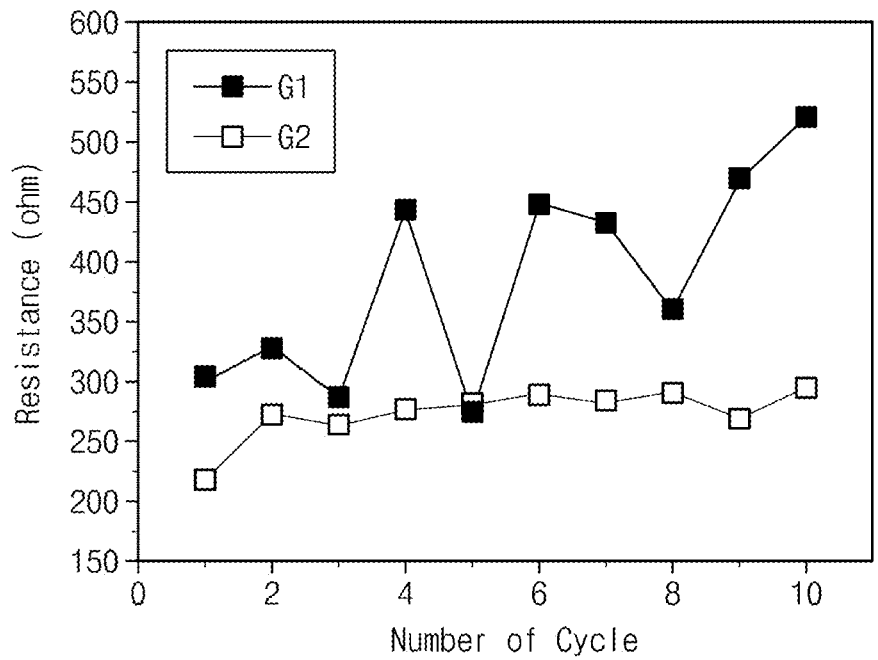
FIG. 13A is a graph illustrating a flexibility test result of a transparent conductor fabricated according to an embodiment of the inventive concepts.

FIG. 13A is a graph illustrating a flexibility test result of a transparent conductor fabricated according to an embodiment of the inventive concepts. Referring to FIG. 13A, a first graph G1 is a graph of a transparent conductor (hereinafter, referred to as 'a comparison sample') fabricated by spraying metal nanowires separated by a general drop casting method on a flexible substrate. A second graph G2 is a flexibility test graph of a transparent conductor (hereinafter, referred to as 'an embodiment sample') fabricated by applying the steps 100, 200, 300, 400, 500, and 600 of the inventive concepts to a flexible substrate. In FIG. 13A, a horizontal axis represents a bending number of times of the transparent conductor and a vertical axis represents a resistance of the transparent conductor. A resistance variation of the embodiment sample according to the bending number of times is less than that of the comparison sample according to the bending number of times. Additionally, the resistance of the embodiment sample according to the bending number of times is more uniformly increased than that of the comparison sample. This is because the fusion amount of the metal nanowires according to the inventive concepts is greater than that of metal nanowires of the comparison sample. This means that the metal nanowires according to the inventive concepts may not be separated from each other even though the transparent conductor is bent.

Figure 13B:
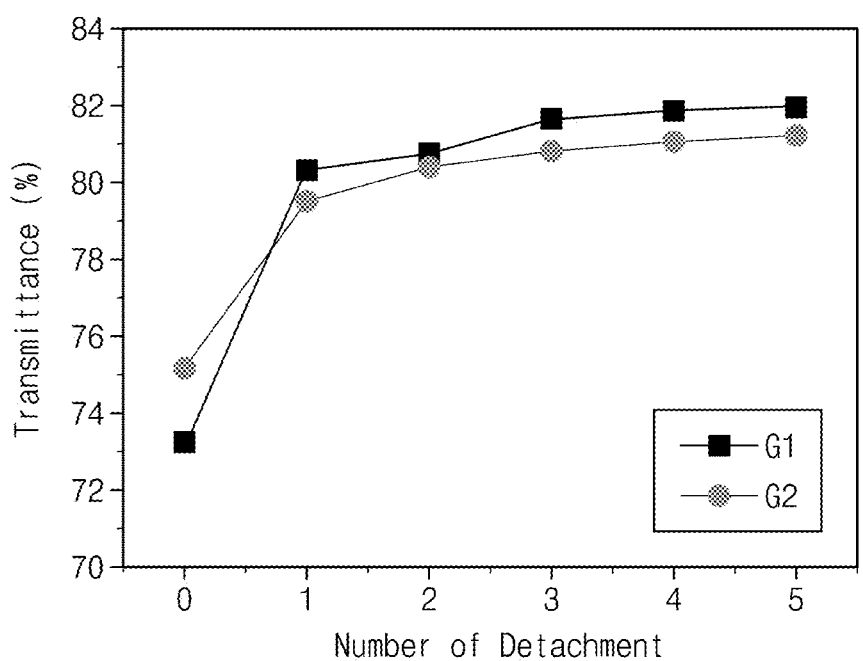
FIG. 13B is a graph illustrating a stability test result of a transparent conductor fabricated according to an embodiment of the inventive concepts.

FIG. 13B is a graph illustrating a stability test result of a transparent conductor fabricated according to an embodiment of the inventive concepts. Referring to FIG. 13B, a first graph G1 is a graph of a transparent conductor (hereinafter, referred to as 'a comparison sample') fabricated by spraying metal nanowires separated by a general drop casting method on a flexible substrate. A second graph G2 is a graph of a transparent conductor (hereinafter, referred to as 'an embodiment sample') fabricated by applying the steps 100, 200, 300, 400, 500, and 600 according to the inventive concepts to a flexible substrate. In FIG. 13B, a horizontal axis represents the number of attaching/detaching an adhesive tape to/from the transparent conductor and a vertical axis represents a transmittance of the transparent conductor. A transmittance variation of the embodiment sample according to the attaching/detaching number of the adhesive tape is less than that of the comparison sample according to the attaching/detaching number of the adhesive tape. This means that the fusion amount of the metal nanowires according to the inventive concepts is greater than that of metal nanowires of the comparison sample so that the transparent conductor of the embodiment sample is not easily separated from the flexible substrate.

As described above, according to embodiments of the inventive concepts, the organic protection agent is chemically and physically separated from the metal nanowire through the first cleaning process and the second cleaning process during fabrication of the metal nanowire dispersion solution. Thus, the contact resistance between the metal nanowires can be reduced to improve the electric conductivity of the transparent conductive layer.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A method of fabricating a metal nanowire dispersion solution, the method comprising:
heating a first solution including a metal compound, a catalyst, an organic protection agent and menstruum, thereby forming metal nanowires in the first solution;
performing a first cleaning process by providing a first solvent into the first solution to form a middle solution, thereby dissolving the organic protection agent surrounding the metal nanowires from the metal nanowires;
vacuum-filtering the middle solution, thereby separating the metal nanowires from the middle solution;

performing a second cleaning process after the vacuum-filtering by sonicating a second solution formed by adding the metal nanowires into a second solvent, thereby removing a remaining organic protection agent in the second solution; and dispersing the metal nanowires in a dispersion solvent.

2. The method of claim 1, wherein the first solution is vacuum-filtered through a glass funnel filter;

wherein the menstruum, the catalyst, the first solvent and the organic protection agent pass through the glass funnel filter; and wherein the metal nanowires are accumulated on the glass funnel filter to be separated from the first solution.

3. The method of claim 1, wherein the performing a first cleaning process and the separating the metal nanowires are repeated four, five, or six times.

4. The method of claim 1, wherein the first solvent includes at least one of water, isopropyl alcohol, ethanol, methanol, and any combination thereof.

5. The method of claim 4, wherein the organic protection agent includes polyvinyl pyrrolidone (PVP).

6. The method of claim 1, wherein the metal compound includes silver nitrate ($AgNO_3$) or silver chloride (AgCl);

wherein the menstruum includes ethylene glycol or glycerol; and wherein the metal nanowire are silver nanowires.

7. The method of claim 1, wherein the second solution is sonicated using a power of about 70 W to about 200 W for a time of about 20 seconds to about 30 seconds.

8. The method of claim 1, wherein the second cleaning process is repeated at least four times.

9. The method of claim 1, wherein the second solvent includes at least one of water, isopropyl alcohol, ethanol, methanol, and any combination thereof.

10. The method of claim 9, wherein the organic protection agent includes polyvinyl pyrrolidone (PVP).

\* \* \* \* \*